No. 776,784. PATENTED DEC. 6, 1904.
E. JANIK.
AUTOMATIC COIN DELIVERING APPARATUS.
APPLICATION FILED MAR. 24, 1902.
NO MODEL. 6 SHEETS—SHEET 1.
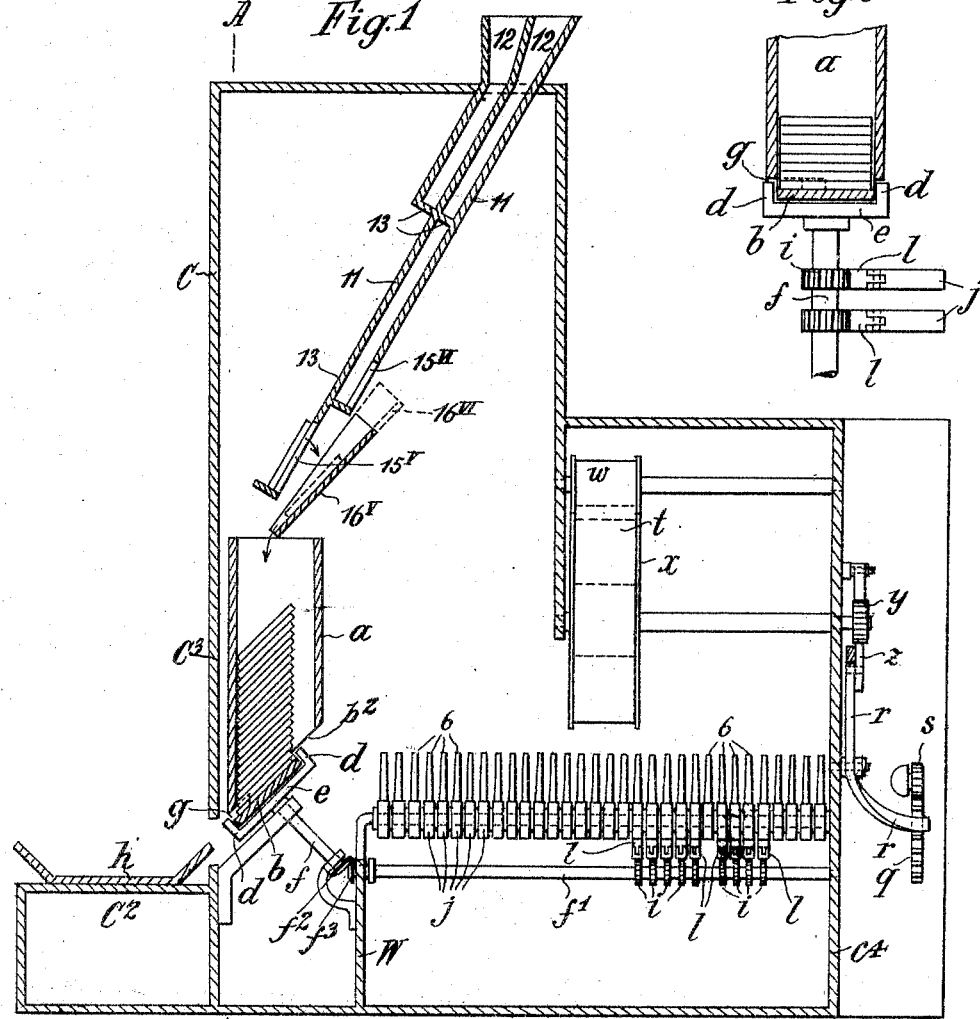
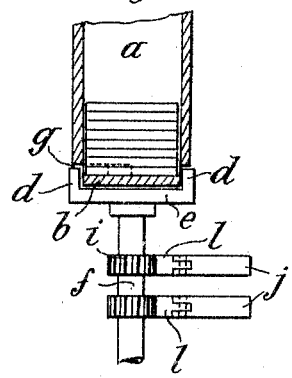
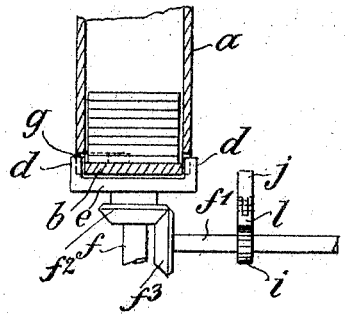
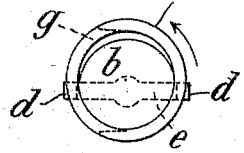
Inventor,
Edward Janik

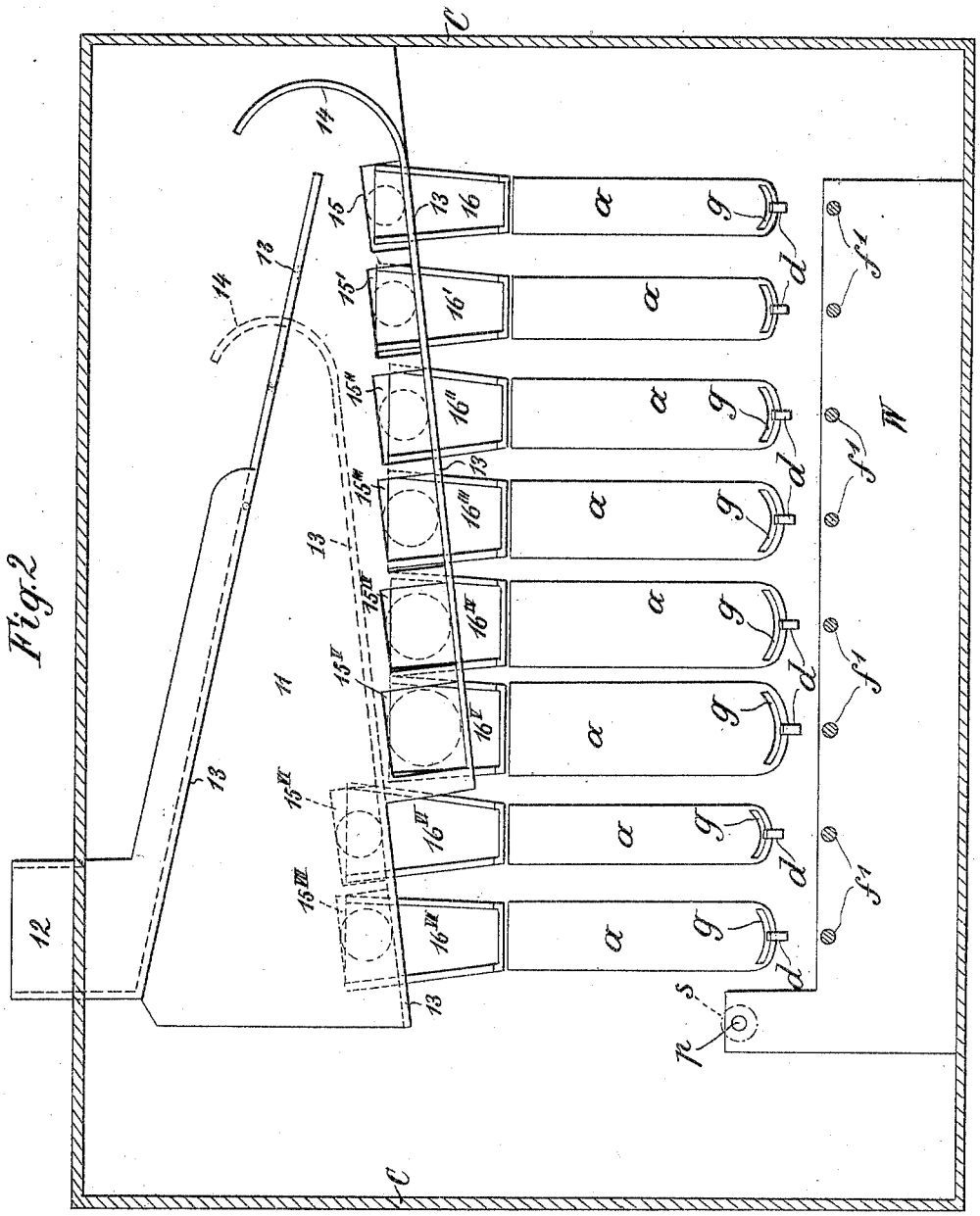

No. 776,784. PATENTED DEC. 6, 1904.
E. JANIK.
AUTOMATIC COIN DELIVERING APPARATUS.
APPLICATION FILED MAR. 24, 1902.
NO MODEL. 6 SHEETS—SHEET 3.

No. 776,784. PATENTED DEC. 6, 1904.
E. JANIK.
AUTOMATIC COIN DELIVERING APPARATUS.
APPLICATION FILED MAR. 24, 1902.
NO MODEL. 6 SHEETS—SHEET 4.

No. 776,784. PATENTED DEC. 6, 1904.
E. JANIK.
AUTOMATIC COIN DELIVERING APPARATUS.
APPLICATION FILED MAR. 24, 1902.
NO MODEL. 6 SHEETS—SHEET 5.
Fig. 5
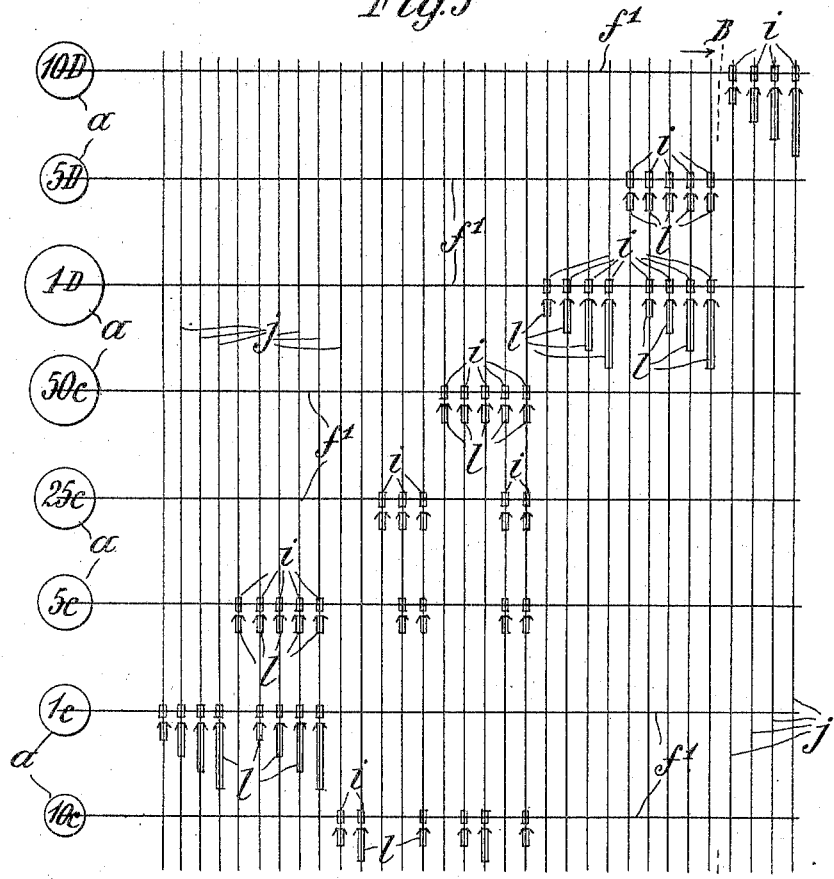
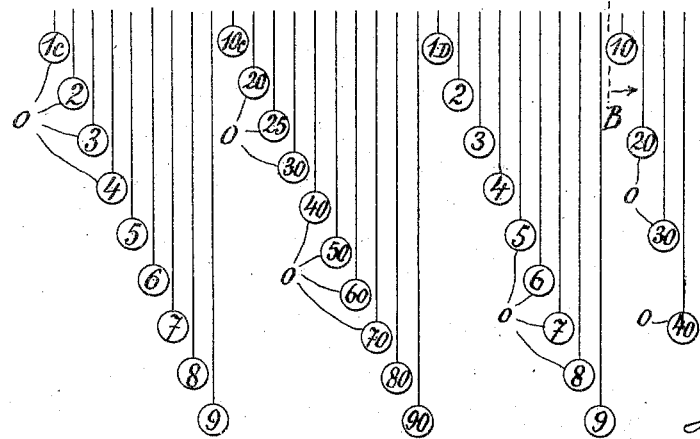
Witnesses:
Inventor.
Edward Janik
By
Atty.

No. 776,784. PATENTED DEC. 6, 1904.
E. JANIK.
AUTOMATIC COIN DELIVERING APPARATUS.
APPLICATION FILED MAR. 24, 1902.
NO MODEL. 6 SHEETS—SHEET 6.
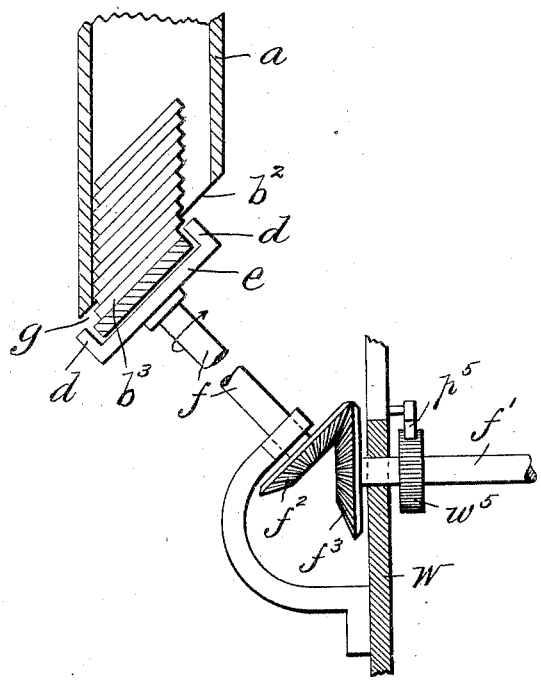
Fig. 5.$^a$
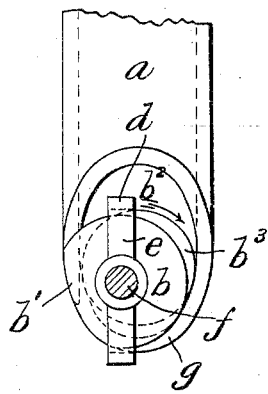
Fig. 5.$^b$
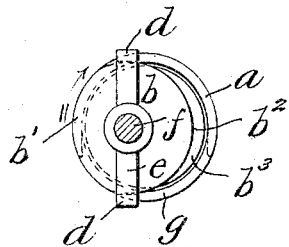
Fig. 7.$^a$
Witnesses.
Harry L. Amer.
Inventor.
Eduard Janik.
by Henry Orth
attys.

No. 776,784.                                                         Patented December 6, 1904.

UNITED STATES PATENT OFFICE.

EDUARD JANIK, OF LEMBERG, AUSTRIA-HUNGARY.

AUTOMATIC COIN-DELIVERING APPARATUS.

SPECIFICATION forming part of Letters Patent No. 776,784, dated December 6, 1904.

Application filed March 24, 1902. Serial No. 99,732. (No model.)

*To all whom it may concern:*

Be it known that I, EDUARD JANIK, a subject of the Emperor of Austria-Hungary, residing at Lemberg, in the Province of Galicia, in the Empire of Austria-Hungary, have invented certain new and useful Improvements in Automatic Coin-Delivering Apparatus; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has relation to key-operated coin-delivering machines combined with recording appliances for recording the amounts delivered, and preferably also combined with coin assorting and feeding appliances for replenishing the coin-holders.

Figure 3:
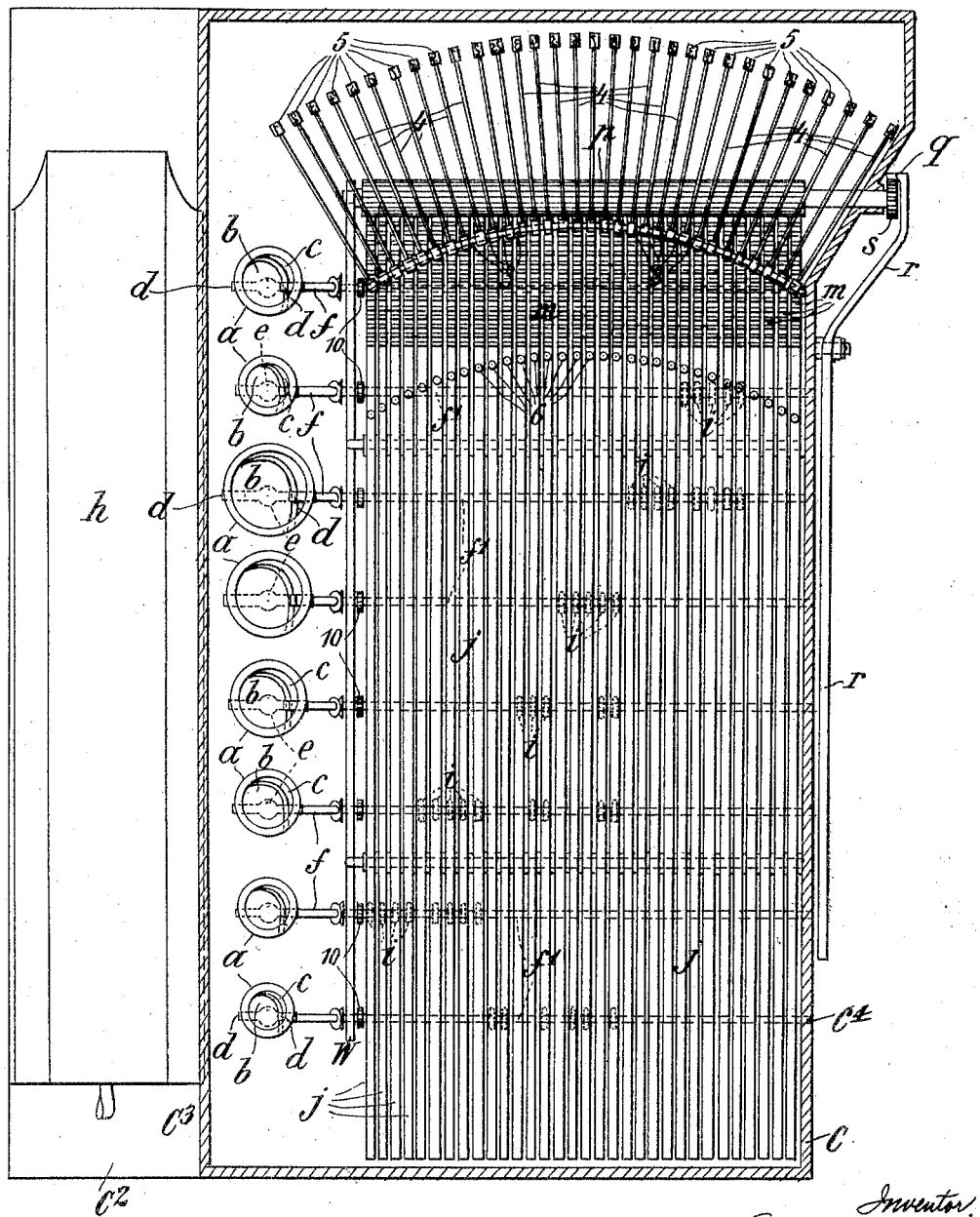
Figure 4:
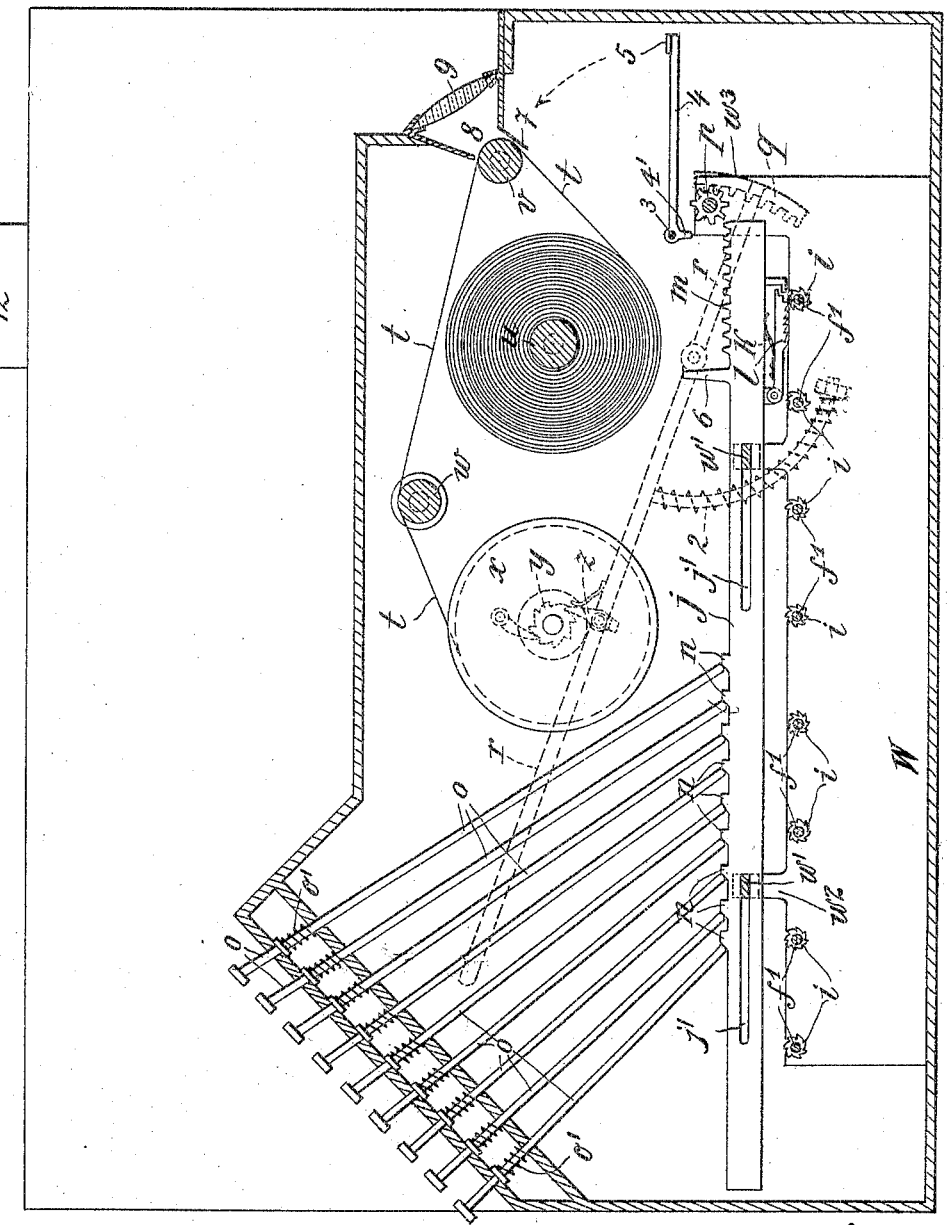

In the accompanying drawings, Figure 1 is a vertical transverse section of a coin-delivering machine embodying my invention. Fig. 2 is a vertical longitudinal section on line A A of Fig. 1. Fig. 3 is a horizontal longitudinal section of the machine, parts located above the type-levers and the ejector-actuating bars which control said type-levers and the coin-delivering apparatus being omitted, the arrangement of said type-levers being shown more or less conventionally. Fig. 4 is a longitudinal section of the machine on line B B of Fig. 5 looking in the direction of the arrow and showing some of the push bars or keys and the recording appliances. Fig. 5 is a diagrammatic plan view illustrating the general arrangement of the appliances which control the coin-ejectors. Fig. $5^a$ is a fragmentary vertical section, and Fig. $5^b$ a fragmentary elevation, of a coin-holder having its delivery end inclined or oblique relatively to its vertical axis, said Fig. $5^a$ also showing the driving connection between the ejector and its actuating-shaft. Figs. 6 and 7 are a fragmentary vertical section and a top plan view, respectively, of a coin-holder having its delivery end horizontal or at right angles to its vertical axis; and Fig. $7^a$ is an under side view of said coin-holder; and Fig. 8 is a view similar to Fig. 6, showing a modification of the arrangement of the appliances for actuating the coin-ejector.

The devices of which the machine is composed are contained in a casing C, having an inclined raised portion or keyboard C' at that end which I may term the "front" end of the machine, through which inclined portion project the push bars or keys hereinafter referred to as the "keys" $o$, that serve to move rack-bars $j$ into position for actuating the coin-ejectors, each of said keys having a given sum indicated on its head or finger piece, Fig. 5, and are retracted when depressed or pushed in by the springs $o'$, Fig. 4. The casing C at one of its longer sides is constructed to form a shelf $C^2$ or may have such shelf secured to the wall $C^3$ of the longer side for the reception of a coin-receiving tray $h$, Figs. 1 and 3, said side wall having a suitable slot or slots for the passage of the coins to said tray from the coin-holders.

Within the casing C along side wall $C^3$ is a row of coin-holders $a$, with their delivery-aperture $g$ in line with the slot or slots in casing-wall $C^3$, and in Figs. 3 and 5 I have shown eight such coin-holders in a row, preferably of cylindrical form, at least internally, and of an internal diameter to accommodate coins of various values and diameters, as ten, one, five, twenty-five, and fifty cent pieces, and one, five, and ten dollar pieces, which holders I have shown in Fig. 5 arranged in the order named. In Figs. 1, $5^a$, and $5^b$ I have shown a coin-holder the delivery end of which is inclined or oblique relatively to the vertical axis of the holder and provided with a coin-delivery slot $g$ at the lowermost point and with a substantially circular bottom $b$, secured thereto or formed therewith at one point $b'$, whereby an arcuate opening $b^2$ is formed at the upper part of the oblique lower end of the holder, so that a coin can be readily pushed out of the slot $g$ by means of a suitable ejector. As shown in said Figs. 1, $5^a$, and $5^b$ the ejector consists of a bar $e$, having at either end a projection $d$, straddling or overlapping the bottom $b$ of holder $a$, said bar $e$ being secured to a spindle $f$, revoluble in suitable bearings eccentric to the axis of the holder-bottom $b$.

When the ejector is rotated in the direction indicated by the arrows, Figs. 5ª and 5ᵇ, one of its projections or lugs $d$ in opening $b^2$ for the time being in contact with the periphery of a coin $b^3$ on bottom $b$ of holder $a$ will push said coin down and through the delivery-slot $g$ and through the slot in the wall $C^3$ of casing C, from which it will drop into tray $h$. The arrangement is such that a coin will be ejected at every half-revolution of the ejector, at the completion of which one of the projections $d$ of said ejector will face the slot $g$ and prevent accidental dropping out of a coin, as shown in Figs. 2 and 5ª.

The delivery end and bottom of the coin-holders $a$ may be horizontal, as shown in Figs. 6, 7, 7ª, and 8, though I prefer to make it slanting, as above described, the tendency of the coins being to move to the delivery-slot and can be ejected with a minimum expenditure of power. When the bottom of the coin-holder is horizontal, the ejector-spindle $f$ is of course vertical, as shown in Fig. 6, and rotation is imparted to said spindle by a shaft $f'$, as will now be described.

Each ejector-spindle $f$ carries a bevel-pinion $f^2$ in gear with a like pinion $f^3$ on one end of a shaft $f'$, said shafts being mounted to revolve in bearings in the side wall $c^4$ of the casing and in a partition W, Figs. 1, 3, and 4, having vertical extensions $w^2$ at suitable distances apart and a like extension $w^3$ at its rear end, which latter has a bearing for one of the journals of a long pinion $p$, whose other journal is mounted in a bearing in and projects through the aforesaid side wall $c^4$ of casing C, Figs. 3 and 4, and has secured thereto a pinion $s$.

To the extensions $w^2$ of partition W and to side wall $c^4$ of casing C are secured guide-bars $w'$, of which I have shown two in Fig. 4, said guide-bars passing through longitudinal slots $j'$ in rack-bars $j$, arranged parallel with the side walls $C^3$ $c^4$ of the casing and the row of coin-holders $a$. At its rear end each bar $j$ is provided with teeth for a suitable distance to form a rack $m$, adapted to be brought into gear with the pinion $p$, hereinabove referred to and common to all the bars $j$, to each of which is pivotally connected one or more toothed or rack pawls $l$, adapted to engage a pinion or ratchet-wheel $i$ on one or more ejector-actuating shafts $f'$, each of which carries a plurality of such pinions or ratchet-wheels, whose actuating-pawls are held in engagement therewith by springs $k$, Fig. 4. In order to prevent backward rotation of the ejector-actuating shafts $f'$, I secure to each of them a ratchet-wheel $w^5$, engaged by a pawl $p^5$, pivoted on a stud secured to the partition W, as more clearly shown in Fig. 5ª. Each bar has a lug or projection $n$ on its upper face, engaged by a key $o$, and a vertically-projecting finger-piece 6 in front of the rack portion $m$ for purposes hereinafter explained. The arrangement of the rack-bars $j$ relatively to the long pinion $p$ is such that when one or more keys $o$ are depressed the corresponding rack-bar or rack-bars are moved into gear with said pinion $p$ without appreciably affecting the corresponding ejector-actuating shaft or shafts $f'$. The actuating-shafts $f'$ may, however, be dispensed with and the ratchet-wheels $i$ secured directly to the vertical ejector-spindles $f$, so as to be acted on by the pawl or pawls $l$ on the rack-bars $j$, as shown in Fig. 8.

I have hereinbefore stated that one of the journals of pinion $p$ carries a spur-pinion $s$. This pinion is in gear with a toothed sector $q$ at the end of a hand-lever $r$, fulcrumed to the outer face of the wall $c^4$ of casing C and shown in full lines in Fig. 3 and in dotted lines in Fig. 4. When, therefore, one or more rack-bars $j$ are moved by the corresponding key or keys into gear with pinion $p$ and the hand-lever $r$ is depressed against the stress of a spring 2 acting thereon, the pinion $p$ is rotated and the rack bar or bars $j$ in gear therewith are moved rearwardly, the toothed pawl or pawls $l$ on said bar or bars revolving the ratchet wheel or wheels $i$ on corresponding ejector shaft or shafts $f'$. The rotation of the last-named shaft or shafts is transmitted to the ejector or ejectors $e$, actuated thereby, and the latter are rotated to eject one or more coins from their respective holders. When hand-lever $r$ is released, its spring 2 will return it to a normal position, Fig. 4, thereby reversing the rotation of pinion $p$ through the action of sector $q$ of said lever on pinion $s$, whereby the rack-bar or rack-bars $j$ in gear with said pinion $p$ are retracted or moved forwardly to a normal position, Fig. 4, out of gear with pinion $p$, during which movement the pawls $l$ trail idly over their ratchets. It is obvious, therefore, that whenever lever $r$ is depressed and pinion $p$ is in gear with a plurality of rack-bars $j$, the latter actuating the corresponding ejector-actuating shafts $f'$, coins from a corresponding number of coin-holders $a$ will be simultaneously delivered to the tray $h$. The amplitude of rotation of pinion $p$ in either direction is substantially uniform, being determined by the toothed sector $q$. Hence the throw of the rack-bars $j$ in either direction is also a uniform one.

I have hereinbefore stated that the arrangement and operation of the ejectors $e$ are such that a coin will be ejected from the respective coin-holder $a$ at each half-revolution of said ejectors. I have also stated that the throw of the rack-bars $j$ in either direction is a uniform one. It is obvious, therefore, that if the amplitude of the rearward movement of the rack-bars were sufficient to impart to the ejectors one-half of a revolution only but a single coin could be ejected from a coin-holder whenever a key $o$ is depressed, so that when several coins are to be delivered successively from one and the same coin-holder to make up a given sum a separate manipulation of the corresponding key and of the hand-lever $r$ would become necessary, and the time required for delivering coins of a given amount and the labor in effecting the delivery would be greatly increased. To avoid this, I provide means whereby the ejectors $e$ will be so actuated as to successively deliver a plurality of coins from a given holder $a$ when the key $o$, corresponding to said ejector, is depressed. This I attain by the use of toothed pawls $l$ the number of teeth of which varies, so as to impart to the ejector either one-half of a revolution or a complete revolution or one and a half revolutions or two revolutions. In the first case one coin will be ejected; in the second, two; in the third, three, and in the fourth case four coins, the amplitude of throw of the rack-bars $j$ being a maximum one or sufficient to the purposes in view. This arrangement is more clearly shown in Fig. 5, which also shows as an example a combination of rack-bars $j$ and their pawls and ejector-actuating shafts and their ratchet-wheels $i$ for making up and delivering a considerable number of different sums. Thus, for instance, the ejector-actuating shaft $f'$ for the ten-cent coin-holder is shown as actuated by pawls $l$ on six rack-bars $j$. The number of teeth on four of the pawls $l$ is such that when the rack-bars are moved into gear with the pinion $p$ and the latter is rotated by hand-lever $r$ one-half of a revolution will be imparted to the ejector $e$ for the ten-cent coin-holder, thereby ejecting each time one ten-cent piece, while the number of teeth on the other two pawls is such as to impart to said ejector a complete revolution, whereby two ten-cent pieces are successively ejected. It will, however, be observed that all of these rack-bars except two carry a plurality of pawls adapted to actuate the ratchets $i$ on the ejector-actuating shafts $f$ of other coin-holders whenever brought in gear with pinion $p$ by their respective keys and said pinion is rotated. Thus, for instance, if the ten-cent key is depressed one ten-cent coin will be ejected from its holder, and two ten-cent pieces will be successively ejected when the twenty-cent key is depressed, a complete revolution being imparted to the ejector. On the other hand, if the forty-cent key is depressed one ten-cent piece, one five-cent piece, and one twenty-five-cent piece will be ejected simultaneously from their respective holders. If the ninety-cent key is depressed, one ten-cent piece, one five-cent piece, one twenty-five-cent piece, and one fifty-cent piece will be simultaneously ejected from their respective holders. Similar arrangements are provided for the delivery of one to nine cents, one to nine dollars, and ten to forty dollars. Thus, for instance, by depressing the four-cent or four-dollar or forty-dollar key to move the rack-bars into gear with pinion $p$ and the latter is rotated two complete revolutions will be imparted to the ejectors of the respective coin-holders, thereby ejecting four one-cent pieces successively, and similarly four one-dollar pieces or four ten-dollar pieces, which operations take place simultaneously when the keys mentioned are simultaneously depressed. From what has been said it will readily be seen that an almost endless number of combinations of different values can be made and the amounts in coin delivered to tray $h$.

I will now describe the mechanism for recording the amounts delivered by the machine, referring more particularly to Fig. 4. At its rear end the casing C is provided at a suitable point with a sight-opening 8, closed by a sight-glass or lens 9, in front of which revolves a printing roller or platen $v$, and proximate thereto is arranged an ink-ribbon 7. The record-strip $t$, which may be divided into two columns by a line, is wound on a roll $u$, revolubly mounted in front of the platen $v$, said strip traveling over said platen between it and the ink-ribbon, thence over a guide-roll $w$ onto a winding-roll $x$, revoluble in front of the roll $u$. One of the journals of the winding-roll outside of casing C carries a ratchet-wheel $y$, engaged by a check-pawl, which prevents backward rotation of the roll, and on hand-lever $r$ is pivoted a pawl $z$, held in position for engagement with the ratchet-wheel $y$ by a spring. When hand-lever $r$ is depressed, for purposes above stated, against the stress of its spring 2 and again released, said spring will return said lever to a normal position, during which movement the pawl $z$ will impart to the ratchet-wheel $y$ and winding-roll $x$ a partial rotation of such amplitude as to properly space the amounts recorded on the record-strip $t$. Above pinion $p$ and rack-bars $j$ are arranged type-levers 4, one for each key $o$, in any usual or desired manner, so that the digit-types thereon will be printed in columns, the units and tens on one side of a median line corresponding to the dividing-line of the record-strip, and the hundreds and tens of hundreds on the opposite side of said line, and as there is no "0" type the sum of forty dollars and ninety cents would appear thus on the record-strip | 4 | 9 | or one dollar and five cents would appear thus | 1 | 5 |. The type-levers are fulcrumed on pins 3 and have at their end a depending lug 4', adapted to be engaged by the finger 6, hereinbefore referred to, on the corresponding rack-bar before the latter completes its rearward movement under the action of the pinion $p$.

In Fig. 3 the arrangement of the type-levers 4 in series of units, tens, hundreds, and thousands is shown, each series except the thousands comprising nine levers, carrying at their free end a digit-type from "1" to "9," respectively. The levers 4 are of such relative length and their axes of rotation are arranged at such angles relatively to their longitudinal axes that the types thereof will contact with the platen at points suitably distant from one another on a line common to all the type parallel to the axis of rotation of the platen, so that the digits will be printed on the record-strip in their proper relative positions, as indicated above.

I deem it unnecessary to illustrate in detail the construction of the bearings for the type-levers, as such construction will be readily understood by any skilled manufacturer of type-writers.

For the purpose of replenishing the coin-holders any suitable coin sorting and feeding appliances may be provided, and in Figs. 1 and 2 I have shown a convenient and simple arrangement of coin sorting and feeding device, the gold coins and the silver and nickel coins being sorted separately and fed to their respective sorting devices through separate hoppers. Each of these two devices is composed of a smooth board 11, which is somewhat inclined to the vertical and is provided with a supply-hopper 12 for the insertion of the coins, a strip 13, attached to the board 11, being connected to the said supply-hopper. The coins that are inserted into and slide along the inclined bottom of the hopper 12 roll downward along the before-mentioned strip 13, while they remain constantly in contact with the front surface of the board and are separated one from another in consequence of their different weights and the differences in rolling friction caused by their differences in diameter. To enable a path of as great a length as possible to be obtained on a board of moderate size, it is advantageous to place several such strips 13 one over another, the strips being provided with curved projections or guards 14, Fig. 2, for guiding the coins that fall from the end of one strip upon the beginning of the strip immediately underneath. The portion of the board adjacent to the lower end of the strip 13 or of the lowest strip is provided with a number of openings 15 15$^I$ 15$^{II}$ of successively increasing diameter and serve for sorting the several passing coins. The smallest coins fall through the uppermost opening 15 into a channel 16 and enter the coin-receptacle $a$. The next size larger is caught by the opening 15$^I$ and led by the channel 16$^I$ to the corresponding receptacle, and the largest coins roll to the lowest opening 15$^V$ and slide along the channel 16$^V$ into the corresponding receptacle $a$. In this way the coins are sorted according to size in a continuous and automatic manner. The sorting device for gold coins is provided with only two openings 15$^{VI}$ and 15$^{VII}$, under which are arranged the channels 16$^{VI}$ and 16$^{VII}$, respectively, for the reception of five and ten dollar pieces, respectively. This device for sorting coins is rigidly connected with that for sorting silver and nickel coins and is provided with an equal number of strips 13 as the latter.

Having thus described my invention, what I claim as new therein, and desire to secure by Letters Patent, is—

1. A coin-delivery machine comprising coin-holders adapted to hold coins of a given value, an ejector for each of said holders, revoluble in one direction only and adapted to eject a coin from its holder when rotated to a certain extent, and hand-operated appliances organized to impart to an ejector or ejectors a rotation of given amplitude, or of increasing amplitude, to eject one coin, or to successively eject a plurality of coins from one or more coin-holders at each operation of said hand-operated appliances, substantially as set forth.

2. A coin-delivery machine comprising coin-holders each adapted to hold coins of a given value, a revoluble coin-ejector for each of said holders, an actuating-shaft for each ejector, a driving connection between the two, a rack-bar for each of said shafts geared to one or more of them, a pinion common to all the rack-bars, a key for each rack-bar adapted to move the same from a normal position into gear with said pinion without thereby materially influencing the corresponding ejector-actuating shaft, and means for rotating said pinion to move the rack bar or bars in gear therewith and rotate the corresponding ejector-actuating shaft or shafts, for the purpose set forth.

3. A coin-delivery machine comprising coin-holders each adapted to hold coins of a given value, a revoluble coin-ejector for each of said holders, an actuating-shaft for each ejector, a driving connection between the two, a rack-bar for each of said shafts geared to one or more of them, a pinion common to all the rack-bars, a key for each rack-bar adapted to move the same from a normal position into gear with said pinion without thereby materially influencing the corresponding ejector-actuating shaft, in combination with means for rotating said pinion to move the rack bar or bars in gear therewith and rotate the corresponding ejector-actuating shaft or shafts, and means for returning said rack bar or bars to a normal position without reversing the rotation of the corresponding actuating shaft or shafts, for the purpose set forth.

4. A coin-delivery machine comprising coin-holders, each adapted to hold coins of a given value, a revoluble coin-ejector for each of said holders, an actuating-shaft for each ejector, a driving connection between the two, a rack-bar for each of said shafts, each of said bars geared to one or more of the shafts, a pinion common to all the rack-bars, a key for each rack-bar adapted to move the same from a normal position into gear with said pinion without thereby materially influencing the corresponding ejector-actuating shaft; in combination with means for rotating said pinion to move the rack bar or bars and rotate the corresponding ejector-actuating shaft or shafts, and means for automatically returning said rack bar or bars to a normal position without reversing the rotation of the corresponding actuating shaft or shafts, for the purpose set forth.

5. A coin-delivery machine comprising coin-holders, each adapted to hold coins of a given value, a revoluble ejector for each of said holders, organized to eject a coin therefrom when rotated to a certain extent, an actuating-shaft for each ejector, a driving connection between the two, a rack-bar for each of said shafts geared to one or more of them in such manner as to impart to the shaft a rotation of given amplitude or of increasing amplitude, a pinion common to all the rack-bars, and a key for each of them adapted to move its rack-bar into gear with said pinion without materially influencing the actuating shaft or shafts geared thereto; in combination with means for rotating the aforesaid pinion to move the rack bar or bars into gear therewith and rotate the actuating shaft or shafts geared to said bar or bars, for the purpose set forth.

6. A coin-delivery machine, comprising coin-holders, each adapted to hold coins of a given value, a revoluble ejector for each of said holders adapted to eject a coin therefrom at each partial revolution, an actuating-shaft for each ejector, a driving connection between the two, a rack-bar for each of said shafts, one or more toothed pawls pivotally connected to each of said rack-bars and adapted to engage a ratchet-wheel on one or more actuating-shafts, the number of teeth of said pawls varying for the purpose of varying the rotary movements of the corresponding shaft or shafts, a pinion $p$ common to all the rack-bars, and a key for each of them operating to move its rack-bar from a normal position into gear with said pinion; in combination with means for rotating said pinion in opposite directions to move the rack bar or bars into gear therewith and thereby rotate the corresponding actuating shaft or shafts and to move said bar or bars back into normal position, for the purpose set forth.

7. A coin-delivery machine comprising coin-holders, each adapted to hold coins of a given value, a revoluble ejector for each of said holders adapted to eject a coin therefrom at each partial revolution, an actuating-shaft for each ejector, a driving connection between the two, a rack-bar for each of said shafts, one or more toothed pawls pivotally connected to each of said rack-bars and adapted to engage a ratchet-wheel on one or more actuating-shafts, the number of teeth of said pawls varying for the purpose of varying the rotary movements of the corresponding shaft or shafts, a pinion $p$ common to all the rack-bars, and a key for each of them operating to move its rack-bar from a normal position into gear with said pinion; in combination with means for rotating said pinion in opposite directions to move the rack bar or bars into gear therewith and thereby rotate the corresponding actuating shaft or shafts and to move said bar or bars back into normal position, and means locking the actuating shaft or shafts rotated by the pawl or pawls on the rack bar or bars against reverse rotation when said bar or bars are moved back to normal position, for the purpose set forth.

8. A coin-delivery machine comprising coin-holders, each adapted to hold coins of a given value, a revoluble ejector for each of said holders adapted to eject a coin therefrom at each partial revolution, an actuating-shaft for each ejector, a driving connection between the two, a rack-bar for each of said shafts, one or more toothed pawls pivotally connected to each of said rack-bars and adapted to engage a ratchet-wheel on one or more actuating-shafts, the number of teeth of said pawls varying for the purpose of varying the rotary movements of the corresponding shaft or shafts, a pinion $p$ common to all the rack-bars, and a key for each of them operating to move its rack-bar from a normal position into gear with said pinion; in combination with a hand-lever provided with a toothed sector in gear with a pinion $s$ on one of the journals of the aforesaid pinion $p$, for the purpose set forth.

9. A coin-delivery machine comprising coin-holders, each adapted to hold coins of a given value, a revoluble ejector for each of said holders adapted to eject a coin therefrom at each partial revolution, an actuating-shaft for each ejector, a driving connection between the two, a rack-bar for each of said shafts, one or more toothed pawls pivotally connected to each of said rack-bars and adapted to engage a ratchet-wheel on one or more actuating-shafts, the number of teeth of said pawls varying for the purpose of varying the rotary movements of the corresponding shaft or shafts, a pinion $p$ common to all the rack-bars, and a key for each of them operating to move its rack-bar from a normal position into gear with said pinion; in combination with a hand-lever provided with a toothed sector in gear with a pinion $s$ on one of the journals of the aforesaid pinion $p$, and a spring operating to return said lever to a normal position and thereby reverse the rotation of the pinion $s$, for the purpose set forth.

10. A coin-delivery machine, comprising coin-holders, each adapted to hold coins of a given value, a revoluble coin-ejector for each of said holders, an actuating-shaft for each ejector, a driving connection between the two, a rack-bar for each of said shafts geared to one or more of them, a pinion common to all the rack-bars, a key for each rack-bar adapted to move the same from a normal position into gear with said pinion without thereby materially influencing the corresponding ejector-actuating shaft, and means for rotating said pinion to move the rack bar or bars into gear therewith and rotate the corresponding ejector-actuating shaft or shafts; in combination with a type-lever for each rack-bar actuated thereby when said pinion is rotated, and a platen coöperating with the type-levers to form a record upon a suitable record-strip, for the purpose set forth.

11. The combination with the rack-bars $j$, each provided with a finger 6, the pinion $p$, a key for each of said bars operating to move the same in one direction into gear with said pinion, and means for rotating the latter to impart a further movement to said bars in the same direction; of a type-lever for each of said bars having a depending lug in the path of the aforesaid finger on the bar, a platen, a record-strip, and means for moving said strip whenever the aforesaid pinion has been rotated, for the purpose set forth.

12. The combination with the rack-bars $j$ each provided with a finger 6, the pinion $p$, the spur-wheel $s$ on one of its journals, the hand-lever $r$ provided with a toothed sector $q$ at one end in gear with pinion $s$, said lever provided with a pawl Z, and a spring operating to return the lever to a normal position when moved out of it to rotate pinion $p$; of a type-lever for each rack-bar having a depending lug in the path of the finger 6 on the bar, a platen common to all the levers, an ink-ribbon interposed between the platen and type-heads of the levers, a roll of record-strip, a winding-roll, means guiding the record-strip over the platen to the winding-roll, and a ratchet-wheel on the winding-roll journal adapted to be engaged by the pawl Z on aforesaid hand-lever when moved by its spring, substantially as and for the purpose set forth.

13. The combination with a tubular coin-holder having a coin-delivery slot at its lower end, in combination with an ejector consisting of a bar revoluble in a plane eccentric to the axis of the coin-holder and having a lug at either end, one or the other of said lugs adapted to engage on the periphery of the lowermost coin in the holder and push said coin out of said slot when the ejector is rotated, substantially as set forth.

14. The combination with a tubular coin-holder having its lower end beveled or oblique to the axis of the holder and provided with a coin-delivery slot at the lowermost point; of an ejector consisting of a bar revoluble in a plane eccentric to the axis of the holder and having a lug at either end, one or the other of said lugs adapted to impinge on the periphery of the lowermost coin in the holder and push said coin out of the delivery-slot when the ejector is rotated, substantially as set forth.

In testimony that I claim the foregoing as my invention I have signed my name in presence of two subscribing witnesses.

EDUARD JANIK.

Witnesses:
JOSEF RUBARCK,
ALVESTO S. HOGUE.